US006868671B2

(12) United States Patent
Ehara et al.

(10) Patent No.: US 6,868,671 B2
(45) Date of Patent: Mar. 22, 2005

(54) HYDRAULIC CIRCUIT FOR A CRANE

(75) Inventors: Masaaki Ehara, Akashi (JP); Katsuki Yamagata, Akashi (JP); Taisuke Tsunoo, Akashi (JP); Takahiro Kobayashi, Akashi (JP); Ryo Yamamoto, Kobe (JP); Noboru Ito, Kobe (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 417 days.

(21) Appl. No.: 09/904,512

(22) Filed: Jul. 16, 2001

(65) Prior Publication Data

US 2002/0014074 A1 Feb. 7, 2002

(30) Foreign Application Priority Data

Jul. 28, 2000 (JP) ...................................... 2000-229793

(51) Int. Cl.[7] ................................................ F16D 31/02
(52) U.S. Cl. ........................................... 60/421; 60/429
(58) Field of Search ........................... 60/421, 428, 429

(56) References Cited

U.S. PATENT DOCUMENTS 3,686,862 A 8/1972 Grider et al.
3,922,855 A * 12/1975 Bridwell et al. .............. 60/421
4,528,892 A * 7/1985 Okabe et al. .................... 91/6
6,148,548 A 11/2000 Tohji

OTHER PUBLICATIONS

Patent Abstracts of Japan, JP 2000–017693, Jan. 18, 2000 (with corr. US 6,148,548).

Patent Abstracts of Japan, JP 11 218102, Aug. 10, 1999.

* cited by examiner

*Primary Examiner*—F. Daniel Lopez
(74) *Attorney, Agent, or Firm*—Oblon, Spivak, McClelland, Maier & Neustadt, P.C.

(57) ABSTRACT

The present invention provides a hydraulic circuit for a crane wherein a switching valve is provided between a plurality of motor circuits connected in series within the same actuator group, and at the time of simultaneous operation of the motor circuits, the switching valve is switched from a first position to a second position whereby the series connection between the motor circuits is cut off, and they are driven by each of separate hydraulic sources, thereby enabling prevention of pressure interference at the time of simultaneous operation of the motor circuits within the same actuator group without increasing hydraulic sources.

7 Claims, 5 Drawing Sheets

HYDRAULIC CIRCUIT FOR A CRANE

BACKGROUND OF THE INVENTION

1. Field of the Invention

The present invention relates to a hydraulic circuit for a crane in which a boom hoisting motor circuit and a wind-up motor circuit are connected in series to one and the same hydraulic source.

2. Description of the Related Art

In a case of a normal crawler crane, there are provided winches 1,2 and 3 which are a boom hoisting winch, a main winch and an auxiliary winch, respectively, as shown in FIG. 3. A main jib (boom) 4 is hoisted by the winch for a boom hoisting 1. A main hook 5 suspended from the extreme end of the main jib 4 is moved up and down by the main winch 2. An auxiliary hook 7 suspended from an auxiliary jib 6 mounted on the extreme end of the main jib is moved up and down by the auxiliary winch 3.

In a case of a luffing crane, an auxiliary jib 9 is mounted on the extreme end of a tower type main jib 8, as shown in FIG. 4. A main hook 5 is suspended from the extreme end of the auxiliary jib 9. The auxiliary jib 9 is hoisted by the auxiliary winch 3.

Operations (rotational operation is omitted in explanation here) including travel motion in these cranes are carried out by a hydraulic motor as a driving source. As hydraulic circuits, there are provided a main winding motor circuit, an auxiliary winding motor circuit, a boom hoisting motor circuit, and left and right traveling motor circuits.

A combination of a hydraulic source and an actuator is normally divided, as shown in FIG. 5, into a first actuator group A driven by a first hydraulic source 10 such as hydraulic pump and a second actuator group B driven by a second hydraulic source 11.

A left traveling motor circuit 12, a boom hoisting motor circuit 13, and an auxiliary winding motor circuit 14 belong to the group A. A right traveling motor circuit 15 and a main winding motor circuit 16 belong to the group B.

It is constituted such that in both the groups A and B, the respective motor circuits are connected in series between the hydraulic sources 10, 11 and a tank T, and can be operated either individually or simultaneously.

According to the hydraulic circuit constitution as described above, in the composite operation in which not less than two motor circuits are operated simultaneously, when both the motor circuits belong to the same group, there occurs the following problem.

In a case where the boom hoisting motor circuit 13 and the auxiliary winding motor circuit 14 are operated simultaneously, for example, in a case where a hanging article is moved up and down by the auxiliary hook 7 while hoisting the jib 4 shown in FIG. 3, pressure interference occurs between the circuits 13 and 14. Therefore, the respective operations fail to be carried out smoothly. In a case where the sum of pressure of both the circuits 13, 14 is high, a relief valve in the upstream circuit acts to relieve oil, thus resulting in an inconvenience that no operation can be carried out.

As shown in FIG. 6, a countermeasure is taken into consideration in which the boom hoisting motor circuit 13 is separated from the group A, and a third driving source 17 exclusive use for the circuit 13 is added. In this case, there poses a problem that an increase in cost and an increase in installation space are brought fourth due to further installation of the hydraulic source 17 and the increase in pipes and so on resulting therefrom.

SUMMARY OF THE INVENTION

It is an object of the present invention to provide a hydraulic circuit for a crane capable of preventing pressure interference when motor circuits are driven simultaneously within the same actuator group without increasing hydraulic sources.

The hydraulic circuit for a crane according to the present invention has the following constitution.

First, there is a first actuator group including actuator circuits driven by a first hydraulic source. The actuator circuits include a boom hoisting motor circuit which is a driving circuit for a winch motor for boom hoisting, and a wind-up motor circuit which is a driving circuit for a winch motor for wind-up. Further, the boom hoisting motor circuit and the wind-up motor circuit are selectively connected in series through a control valve for boom hoisting and a control valve for wind-up.

Next, there is a second actuator group including actuator circuits driven by a second hydraulic source.

There is provided a switching valve provided between the control valve for boom hoisting and the control valve for wind-up in the first actuator group. The switching valve is capable of being switched between a first position and a second position, wherein both the boom hoisting motor circuit and the wind-up motor circuit are connected to the first hydraulic source at the first position of the switching valve, and wherein at the second position of the switching valve, the boom hoisting motor circuit and the wind-up motor circuit are cut off from one another and a downstream one of the boom hoisting motor circuit and the wind-up motor circuit is connected to the second hydraulic source via the switching valve.

In this case, when the boom hoisting motor circuit and the wind-up motor circuit connected in series within the same actuator group are operated substantially simultaneously, the switching valve is switched from the first position to the second position, whereby the series connection of both the motor circuits is cut off, and these are driven by separate hydraulic sources, respectively. Therefore, pressure interference therebetween can be prevented. Further, any operation of both the motor circuits can be carried out smoothly.

Further, in a case where the hoisting motor circuit has a main motor circuit which is a driving circuit for a winch motor for main hoisting and an auxiliary motor circuit for auxiliary hoisting which is a driving circuit for a winch motor for auxiliary hoisting, employment of the following constitution is preferable. That is, one out of the main motor circuit and the auxiliary motor circuit is arranged in the first actuator group, and the other is arranged in the second actuator group.

This is the case of a crane provided with both main and auxiliary motor circuits as a wind-up motor circuit, which is able to exhibit the aforementioned effect.

DESCRIPTION OF THE PREFERRED EMBODIMENTS

Several preferred embodiments of the present invention will be described with reference to FIGS. 1 and 2. This is one embodiment of the present invention, and is not limited thereto.

Figure 1:
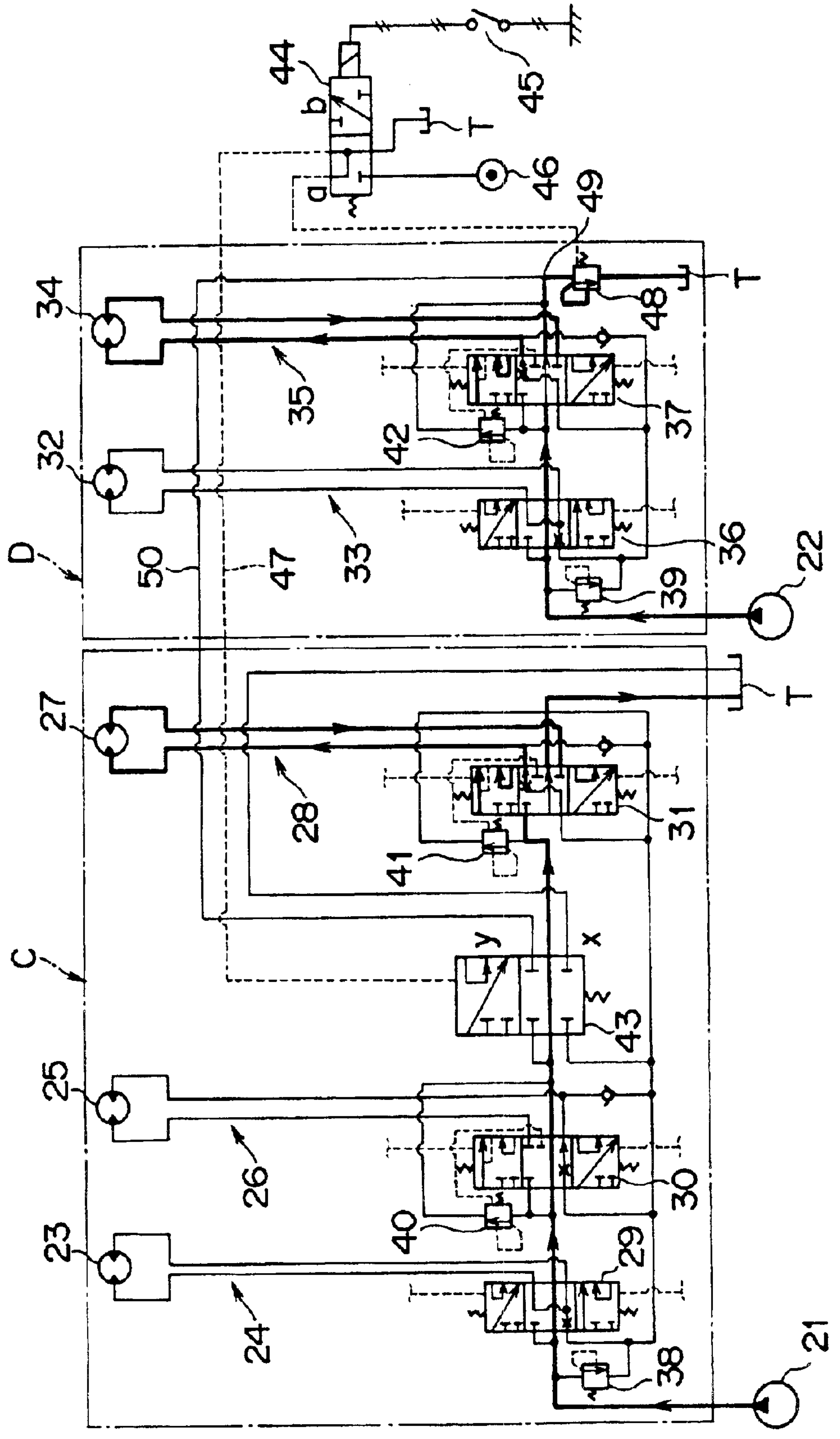
FIG. 1 is a hydraulic circuit view showing, in a thick line, a flow of oil in a state that a switching valve is set to a first position in one embodiment of the present invention.
Figure 2:
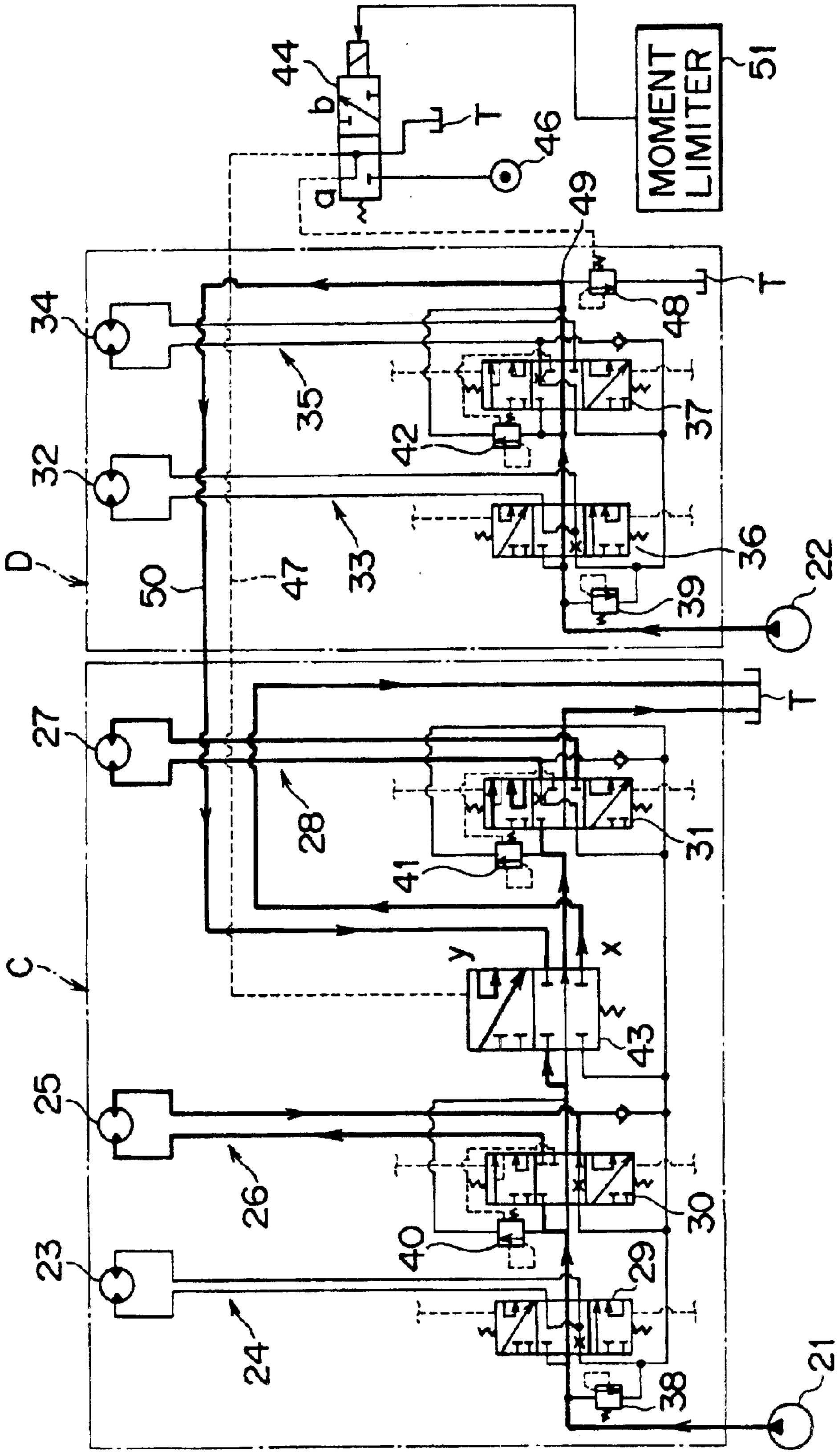
FIG. 2 is a hydraulic circuit view showing, in a thick line, a flow of oil in a state that a switching valve is set to a second position in one embodiment of the present invention.
Figure 3:
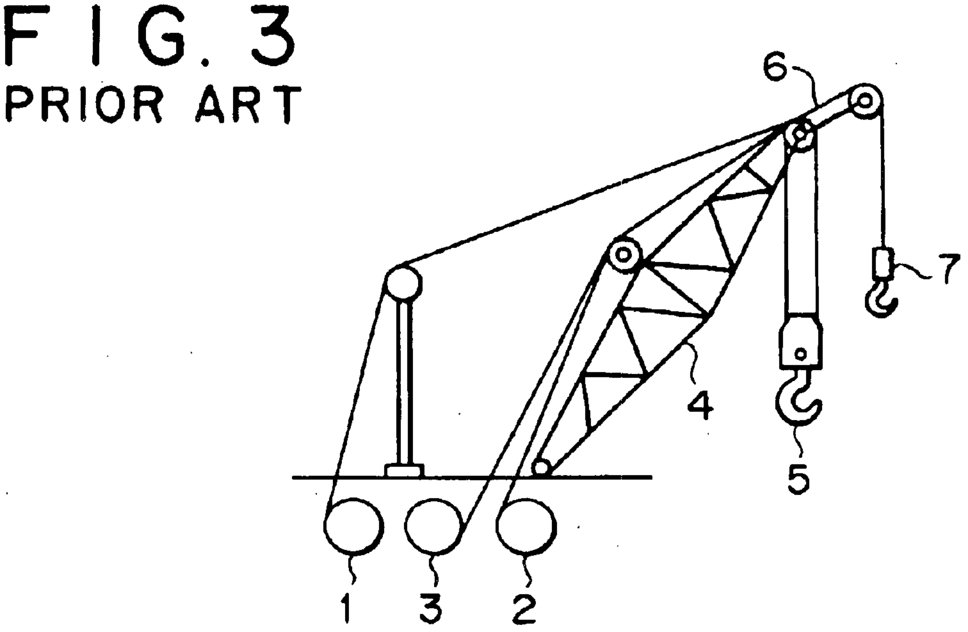
FIG. 3 PRIOR ART
FIG. 3 is a schematic view showing the constitution of a jib hoisting and wind-up portion in a crawler crane.
Figure 4:
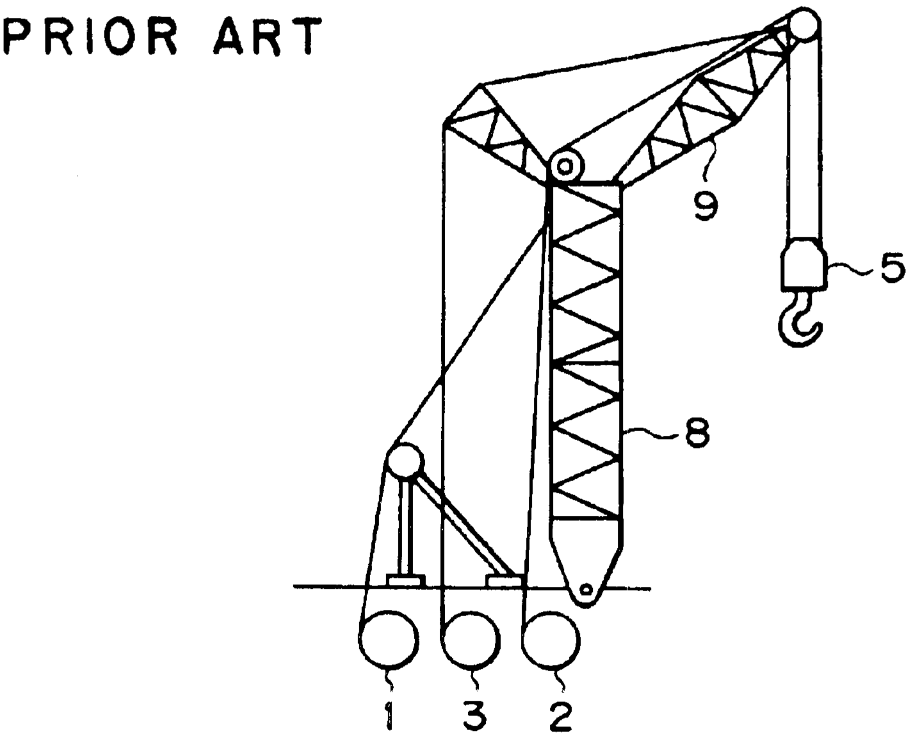
FIG. 4 PRIOR ART
FIG. 4 is a schematic view showing the constitution of a jib hoisting and wind-up portion in a luffing crane.
Figure 5:
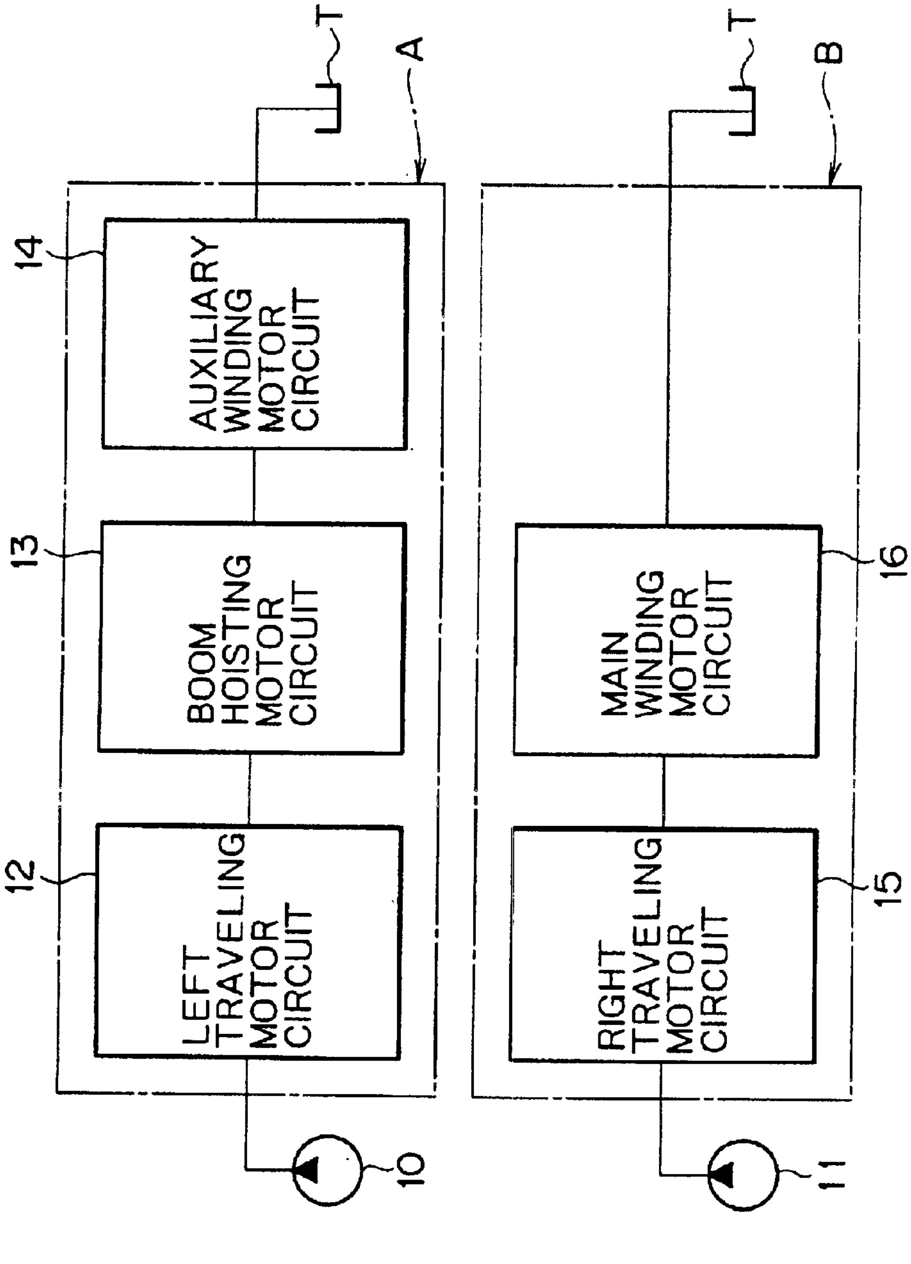
FIG. 5 PRIOR ART
FIG. 5 is a block constitution view of a hydraulic circuit in a conventional crane.
Figure 6:
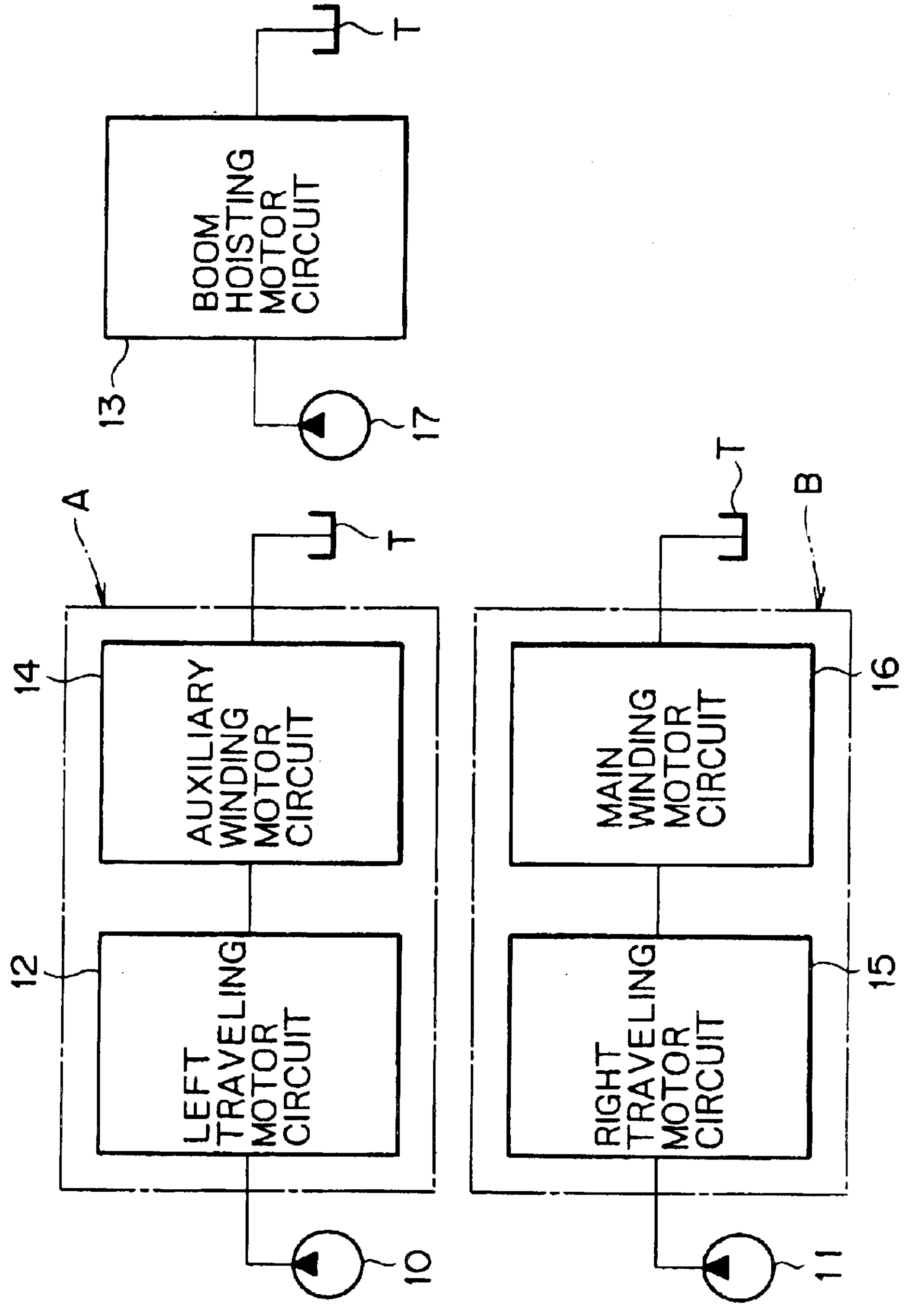
FIG. 6 PRIOR ART
FIG. 6 is a block constitution view of a partly modified constitution of the hydraulic circuit in FIG. 5.

In FIGS. 1 and 2, C designates a first actuator group provided with a first hydraulic source 21, and D designates a second actuator group provided with a second hydraulic source 22.

The first actuator group C comprises a left traveling motor circuit 24 for driving a left traveling motor 23, a boom hoisting motor circuit 26 for driving a boom hoisting and lowering motor 25, and an auxiliary motor circuit 28 for driving an auxiliary winding motor 27. The motor circuits 24, 26 and 28 are connected in series between the hydraulic source 21 and a tank T through mutual control valves 29, 30 and 31.

The second actuator group D comprises a right traveling motor circuit 33 for driving a right traveling motor 32, and a main motor circuit 35 for driving a main winding motor 34. Both the circuits 33 and 35 are connected in series through mutual control valves 36 and 37.

Numerals 38 and 39 designate relief valves provided every group C and D. Numerals 40, 41 and 42 designate flow control valves provided every motor circuit described above.

In the hydraulic circuit, a hydraulic pilot type switching valve 43 is provided between both the control valves 30, 31 for boom hoisting and auxiliary winding in the group C. This switching valve 43 is constituted so as to be switched by an electromagnetic operating valve 44.

When a switch 45 is turned on, the operating valve 44 is switched from a block position "a" shown to an open position "b" on the right side in the figure. At the open position "b", pilot pressure from a pilot hydraulic source 46 is provided to the switching valve 43 through a pilot line 47. The switching valve 43 is switched from a first position "x" shown to a second position "y" on the upper side in the figure.

FIG. 1 and FIG. 2 show, in a thick line, oil flows in a case where the switching valve 43 is at the position "x", and in a case where the valve is switched to a position "y", respectively. At the position "x", both the control valves 30, 31 (both motor circuits 26, 28 for boom hoisting and auxiliary winding) are connected in series.

In this state, any of the motor circuits for left travel motion, boom hoisting and auxiliary winding 24, 26 and 28 can be operated. In a case of FIG. 1, in the group C, the auxiliary motor circuit 28 is in the operating state, and in the group D, the main motor circuit 35 is in the operating state.

It is noted that in the group D, a flow channel switching valve 48 is provided. In FIG. 1, the flow channel switching valve 48 acts as a relief valve. Thereby, oil from a carry-over port 49 in the group D is returned to the tank T.

While in the figure, the channel switching valve 48 is illustrated as a sequence valve, it is noted that a hydraulic pilot type switching valve or the like may be used.

That is, a hydraulic pilot valve is used as a switching valve, and the switching valve may be constituted so that the valve is switched by an electromagnetic operating valve provided in a pilot circuit of the switching valve. In this case, since the switching valve is operated indirectly by the electromagnetic type operating valve, the operating portion can be installed at a position that is easily operated by an operator or at a position in a sufficient space for operation, as compared with the case where the switching valve is operated to be switched directly.

On the other hand, when the jib hoisting operation and the auxiliary winding operation are desired to be carried out simultaneously, the switching valve 43 is switched to the second position "y" through the switch 45 and the operating valve 44.

In this state, both the boom hoisting and auxiliary motor circuits 26, 28 are cut off hydraulically as shown in FIG. 2. Oil from the first hydraulic source 21 is sent to only the left traveling motor circuit 24 and the boom hoisting motor circuit 26.

On the other hand, the switching valve 43 is connected to the carry-over port 49 in the group D through a communication line 50. Therefore, at the second position "y", oil from the second hydraulic source 22 is supplied to the auxiliary motor circuit 28 through the communication line 50 and the switching valve 43. At this time, since the channel switching valve 48 is set to be at high pressure, oil from the carry-over port 49 flows toward the communication line 50.

Accordingly, even if the boom hoisting motor circuit 26 and the auxiliary motor circuit 28 belonging to the same group C are operated simultaneously, no pressure interference likely occurs.

Incidentally, the crane is normally equipped with a moment limiter for detecting a jib angle, a suspension load amount or the like to calculate a load and prevent overload. The operating condition of the crane can be grasped by the moment limiter.

Thus, the moment limiter 51 may be utilized as simultaneous operation detector as shown in FIG. 2. In this case, when the jib hoisting operation and the auxiliary or main operation are carried out simultaneously, a signal can be sent from the moment limiter 51 to the operating valve 44 to automatically switch the switching valve 43.

Accordingly, simultaneous operation detector for detecting the simultaneous operation of the boom hoisting motor circuit and the wind-up motor circuit in the first actuator group C is provided so that the switching valve may be switched to the second position on the basis of a signal from the simultaneous operation detector. Thereby, there occurs no escape of operation of the switching valve 43 or no error in operation, and the intended switching action may be carried out definitely.

On the other hand, while in the above-described embodiment, the switching valve 43 is operated indirectly by the operating valve 44, it is noted that the constitution may be employed in which the switching valve 43 is operated directly manually or electromagnetically.

Further, while in the above-described embodiment, the boom hoisting motor circuit 26 and the auxiliary motor circuit 28 are arranged in the same group (group C), it is noted that the boom hoisting motor circuit 26 and the main motor circuit 35 may be arranged in the same group. Alternatively, the boom hoisting motor circuit 26 and both the main and auxiliary motor circuits 35 and 28 may be arranged in the same group, and when the boom hoisting operation and the wind-up (main winding or auxiliary winding) works are carried out simultaneously, the hydraulic source may be divided.

While one embodiment of the present invention has been disclosed in the foregoing, it is to be noted that the scope of protection of the present invention is not limited thereto.

We claim:

1. A hydraulic circuit for a crane comprising:

a first actuator group including actuator circuits driven by a first hydraulic source, said actuator circuits including a boom hoisting motor circuit as a driving circuit for a winch motor for boom hoisting and a wind-up motor circuit as a driving circuit for a winch motor for wind-up, said boom hoisting motor circuit and said wind-up motor circuit being selectively connected in series through a control valve for boom hoisting and a control valve for wind-up;

a second actuator group including actuator circuits driven by a second hydraulic source; and a switching valve provided between said control valve for boom hoisting and said control valve for wind-up in said first actuator group, wherein said switching valve is capable of being switched between a first position and a second position, wherein both said boom hoisting motor circuit and said wind-up motor circuit are connected to said first hydraulic source at the first position of said switching valve, and wherein at the second position of said switching valve, said boom hoisting motor circuit and said wind-up motor circuit are cut off from one another and a downstream one of said boom hoisting motor circuit and said wind-up motor circuit is connected to said second hydraulic source via said switching valve.

2. The hydraulic circuit for a crane according to claim 1 wherein the actuator circuits in said second actuator group are connected in series through the respective control valves.

3. The hydraulic circuit for a crane according to claim 1 wherein said wind-up motor circuit has an auxiliary motor circuit as a driving circuit for a winch motor for auxiliary hoisting.

4. The hydraulic circuit for a crane according to claim 3 further comprising a main motor circuit arranged in said second actuator group.

5. The hydraulic circuit for a crane according to claim 1 wherein said switching valve comprises a hydraulic pilot valve, said hydraulic pilot valve being switched by an electromagnetic operating valve provided in a pilot circuit of said hydraulic pilot valve.

6. A hydraulic circuit for a crane comprising:

a first actuator group including actuator circuits driven by a first hydraulic source, said actuator circuits including a boom hoisting motor circuit as a driving circuit for a winch motor for boom hoisting and a wind-up motor circuit as a driving circuit for a winch motor for wind-up, said boom hoisting motor circuit and said wind-up motor circuit being selectively connected in series through a control valve for boom hoisting and a control valve for wind-up;

a second actuator group including actuator circuits driven by a second hydraulic source;

a switching valve provided between said control valve for boom hoisting and said control valve for wind-up in said first actuator group, wherein said switching valve is capable of being switched between a first position and a second position, wherein both said boom hoisting motor circuit and said wind-up motor circuit are connected to said first hydraulic source at the first position of said switching valve, and wherein at the second position of said switching valve, said boom hoisting motor circuit and said wind-up motor circuit are cut off from one another and a downstream one of said boom hoisting motor circuit and said wind-up motor circuit is connected to said second hydraulic source; and a simultaneous operation detector for detecting simultaneous operation of said boom hoisting motor circuit and said wind-up motor circuit, said switching valve being switched to the second position on the basis of a signal from said simultaneous operation detector.

7. A hydraulic circuit for a crane, comprising a first actuator group driven by a first hydraulic source and a second actuator group driven by a second hydraulic source, wherein actuator circuits within said both actuator groups are selectively connected in series through respective control valves, and a boom hoisting motor circuit as a driving circuit for a winch motor for jib hoisting for hoisting a jib and a hoisting motor circuit as a driving circuit for a wind-up winch motor for hoisting a hanging article belong to said first actuator group, further comprising a switching valve capable of being switched between a first position and a second position and provided between a control valve for boom hoisting and a control valve for wind-up in said first actuator group, wherein at the second position of said switching valve, said motor circuits are cut off from one another and a downstream one of said motor circuits is connected to the second hydraulic source via said switching valve.

* * * * *